(12) United States Patent
Kramer

(10) Patent No.: US 7,252,017 B2
(45) Date of Patent: Aug. 7, 2007

(54) AXIAL ADJUSTING DEVICE WITH MULTIPLE BALL MEANS

(75) Inventor: Fred Kramer, Wachtberg (DE)

(73) Assignee: GKN Viscodrive GmbH, Lohmar (DE)

( * ) Notice: Subject to any disclaimer, the term of this patent is extended or adjusted under 35 U.S.C. 154(b) by 520 days.

(21) Appl. No.: 10/651,901

(22) Filed: Aug. 29, 2003

(65) Prior Publication Data

US 2004/0107788 A1    Jun. 10, 2004

(30) Foreign Application Priority Data

Sep. 16, 2002  (DE)  ................................. 102 42 928

(51) Int. Cl.
*F16H 25/08* (2006.01)
(52) U.S. Cl. ............................................. 74/57; 74/56
(58) Field of Classification Search .................... 74/56, 74/57; 192/84.6, 93 A; 384/615
See application file for complete search history.

(56) References Cited

U.S. PATENT DOCUMENTS 3,101,813 A * 8/1963 Parrett ........................ 188/71.4
3,583,529 A * 6/1971 Robinson ..................... 188/71.4
4,398,778 A * 8/1983 Kraus .......................... 384/615
4,680,982 A * 7/1987 Wilke et al. ............. 74/424.75
5,106,349 A * 4/1992 Botterill et al. ............. 475/150
5,372,106 A * 12/1994 Botterill ................... 123/198 R

FOREIGN PATENT DOCUMENTS

DE       199 42 462       * 1/2001

* cited by examiner

*Primary Examiner*—William C. Joyce

(57) ABSTRACT

An axial adjusting device comprising two discs which are rotatable relative to one another, which are supported coaxially relative to one another and between which there are guided balls in pairs of ball grooves whose depth varies across the circumference. Of the discs, one is axially supported and one is axially displaceable against resilient returning forces of spring means. At least one of the discs is rotatingly drivable by a driving motor. For load reducing purposes, at least two balls are guided in each of the pairs of ball grooves.

4 Claims, 3 Drawing Sheets

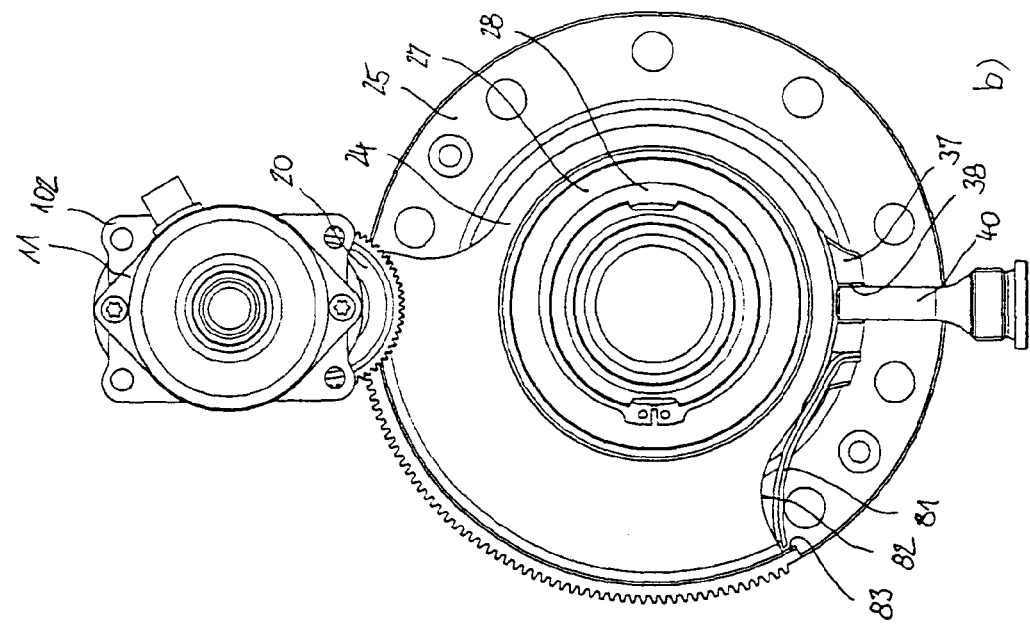
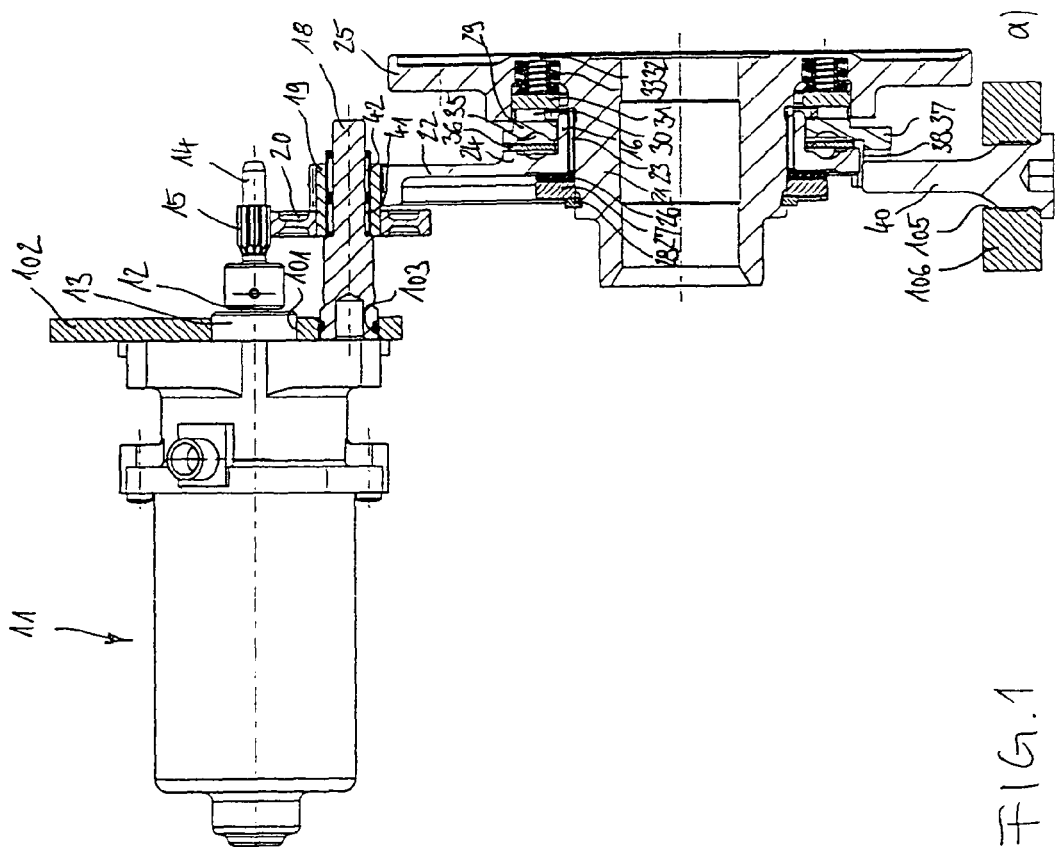
FIG. 1

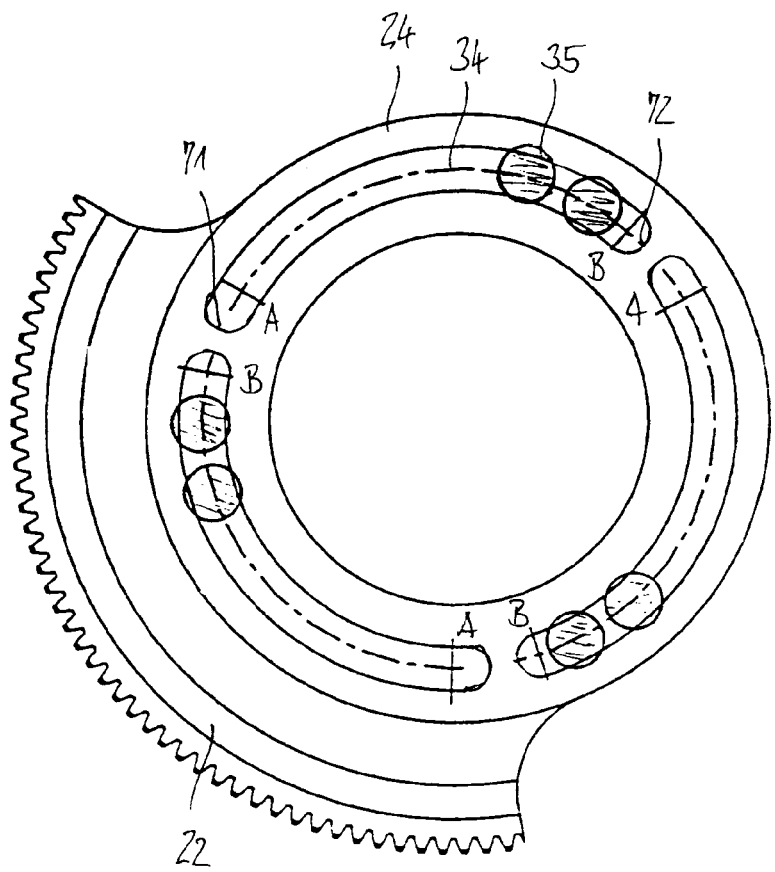
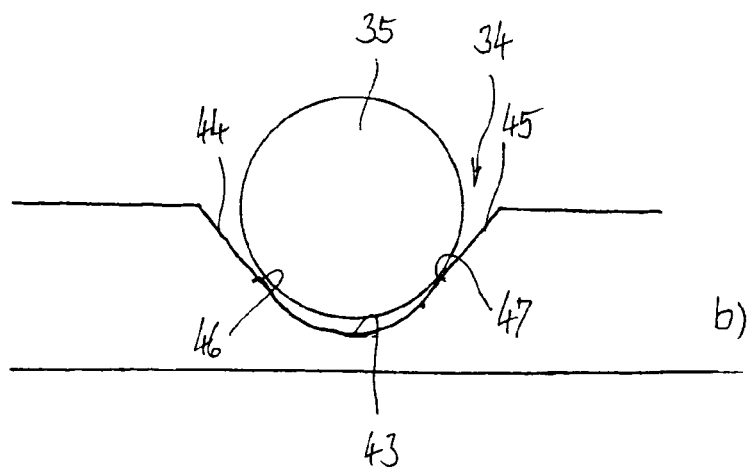
FIG. 3

AXIAL ADJUSTING DEVICE WITH MULTIPLE BALL MEANS

FIELD OF THE INVENTION

The invention relates to an axial adjusting device comprising two discs which are rotatable relative to one another, which are supported coaxially relative to one another and between which there are guided balls in pairs of ball grooves whose depth varies across the circumference. One disc is axially supported and the other disc is axially displaceable against resilient returning forces of spring means. At least one of the discs is rotatingly drivable by a driving motor.

The rotatingly driven disc can, at the same time, be the axially displaceable one, but this is an exception. Usually, the supported disc is rotatingly driven and the axially displaceable disc supported, in turn, via the balls on the supported disc in a rotationally fast way.

BACKGROUND OF THE INVENTION

For actuating the axial adjusting device, the driving motor is driven in a first direction of rotation. At least one of the discs may be coupled to the driving motor, via a reduction stage and rotated. The axially displaceable disc which is supported in turn on the axially supported disc is axially displaced against the resilient returning forces of the spring means.

The balls which contact end stops in the pairs of ball grooves and which, at the same time, are positioned in the deepest groove portions move to flatter groove portions as a result of the rotation of the discs relative to one another, as a result of which the discs are pressed apart.

If the driving motor is driven in the opposite direction or de-energized, the resilient returning forces of the spring means acting on the axially displaceable disc cause the latter to be pushed back. At least one rotatingly drivable disc is actively rotated back by the driving motor or via the effect of the balls in the ball grooves until the balls in their pairs of ball grooves stop against the end stops.

The balls in the ball grooves are subjected to high pressure forces so that ball damage (pittings) cannot be excluded. This may result in the balls being blocked and also in damage to the ball grooves.

OBJECT OF THE INVENTION

It is therefore the object of the present invention to provide a design which reduces the load on the balls and on the ball grooves.

The objective is achieved in that in each pair of ball grooves there are guided at least two balls. A larger number of balls per pair of grooves is possible, but the amount of rotation of the discs relative to each other should not be overly restricted. The individual ball grooves can be radially offset and circumferentially overlapping and partially run parallel to one another. As a result, although a larger number of balls is used, the amount of rotation can be sufficiently large.

The larger number of balls reduces the specific load so that, optionally, smaller balls and thus flatter ball grooves can be used. As a result, the axial length of the device can also be reduced.

SUMMARY OF THE INVENTION

According to a preferred embodiment it is proposed that there are provided three pairs of ball grooves. Furthermore, it is proposed that there is provided a ball cage which holds the at least two balls in each pair of ball grooves at a circumferential distance from one another between the discs. In addition, it is advantageous that the cross-section of the ball grooves deviate from the shape of a circular arch, with the balls each having a two-point contact with the individual ball grooves.

BRIEF DESCRIPTION OF THE DRAWINGS

FIG. 1*a* illustrates the axial adjusting device in an axial section with multiple ball bearings on ball grooves.

FIG. 1*b* illustrates the axial adjusting device in an axial view.

FIG. 3*a* illustrates the second one of the discs according to FIG. 1 with three ball grooves in an axial section.

FIG. 3*b* illustrates the ball groove shape in a cross-section.

DETAILED DESCRIPTION OF THE INVENTION

Figure 2:
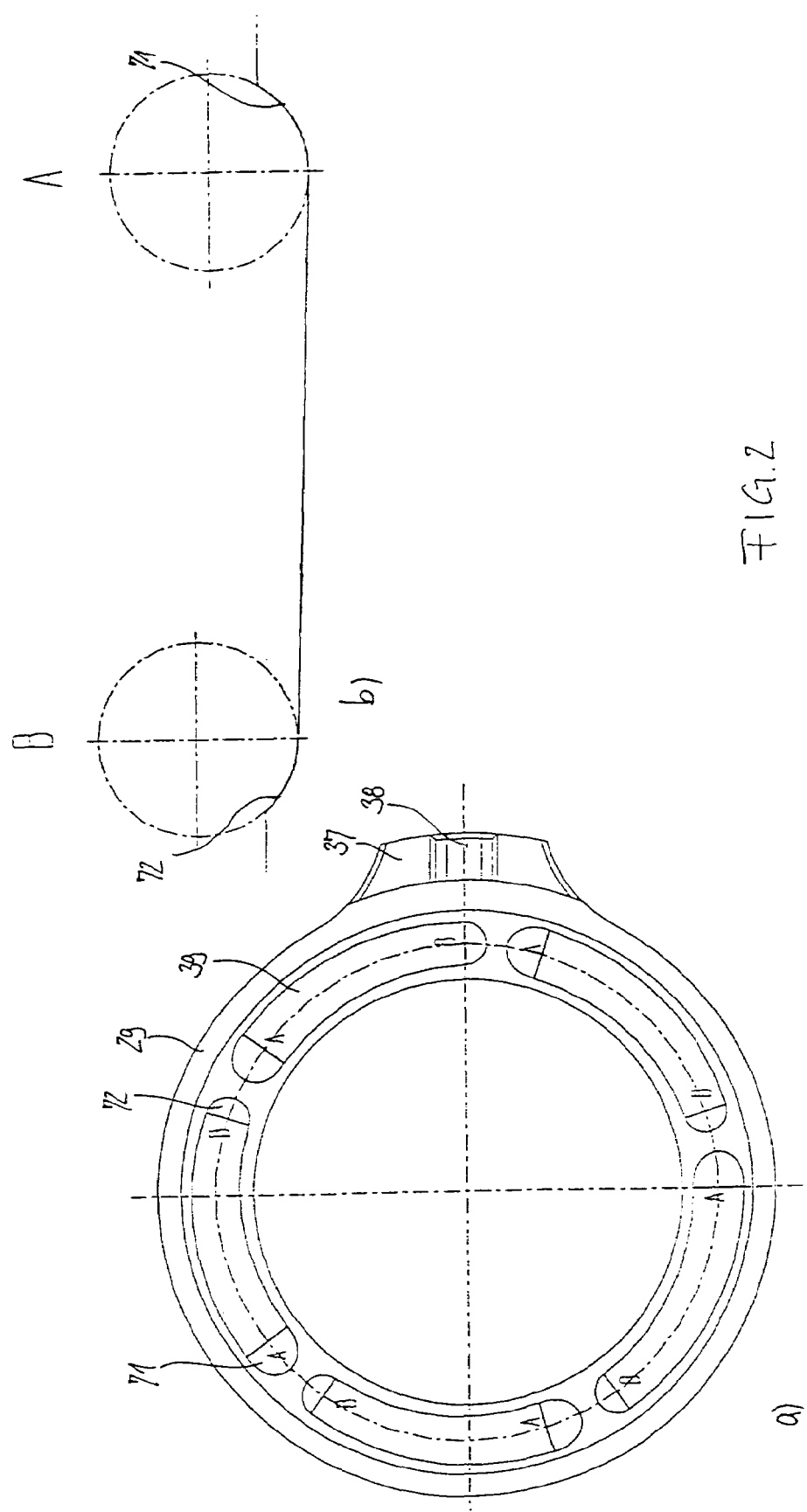
FIG. 2*a* illustrates one of the discs according to FIG. 1 in an axial view in an embodiment with five ball grooves.
FIG. 2*b* illustrates a ball groove shape as a detail in longitudinal section.

FIG. 1*a* illustrates an axial adjusting device in accordance with the invention in a mounted condition. The end of a motor shaft 12 extends from a housing projection 13 of a driving motor 11. The housing projection 13 is inserted into a centering bore 101 in a housing wall 102. A shaft journal 14 with a driving pinion 15 is mounted on the shaft end 12. A bearing journal 18 is inserted into a bore 103 in the housing wall 102, with a sleeve pinion 19 being directly supported via two needle bearings 41 and 42 on the bearing journal 18. A gearwheel 20 which engages the pinion 15 is pressed onto the sleeve pinion 19. The sleeve pinion 19, by means of its toothing, engages a toothed segment 22 which is firmly connected to a first disc 24 of the adjusting device. The disc 24 is rotatably supported via a needle bearing 23 on a projection 21 of a coupling cover 25 on which it is axially supported via an axial bearing 26, a disc 27 and a securing ring 18.

The rotatingly drivable disc 24 cooperates with a further disc 29 which is slidingly supported on a projection 16 at the disc 24 and which is supported via an axial bearing 30 and a disc 31 on pressure springs 33 in the coupling cover 25. The pressure springs 33 contain pressure pins 32 which form the adjusting members. The faces of the discs 24 and 29 which face one another comprise pairs of grooves 34 and 39 whose depths vary around the circumference and in which there run balls 35 which are held in a ball cage 36. Each of the grooves extends from a first stop with the greatest groove depth to a second stop with the smallest groove depth. The disc 29 comprises a radial projection 37 with a guiding claw 38. The guiding claw 38 glides in a longitudinally displaceable way on the holding pin 40 which is firmly inserted into a bore 105 in a housing wall 106 and which, in this way, holds the axially displaceable disc 29 in a rotationally fast way.

FIG. 1*b* illustrates an axial view of the axial adjusting device of FIG. 1*a* with the reference numbers also being the same. FIGS. 1*a* and 1*b* show that a leaf spring 81, whose free end cooperates with a stop curve 82 at the tooth segment 22 of the first disc 24, is bolted to the projection 37 of the disc 29. The end of the leaf spring 81 first glides along the stop curve 82, generating friction forces, until it stops at a stop 83 at the tooth segment 22, with the leaf spring 81 being shortened during further rotation. The leaf spring effectively engages the stop 83 prior to the balls reaching the end stops in the ball grooves.

FIGS. 2a and 2b show the disc 29 in illustration A in an axial view, with the projection 37 and the guiding claw 38 being identifiable as details. The shape of the ball grooves 39 can be seen in detail. There are provided five uniformly circumferentially distributed, equally long ball grooves 39 which extend from a first end stop 71 of the greatest depth at the end A to a second end stop 72 of the smallest depth at the end B. The ball grooves in a matching disc 24, in a plan view, provide an identical image, so that, if the parts are assembled as specified, the pairs of grooves can be made to overlap by means of their first ends A, with one ball resting at the first end stops 71 and with the discs assuming their closest positions relative to one another. A rotation of the discs relative to one another causes the balls in both grooves of a pair of grooves to move to the ends B, as a result of which the axially movable one of the discs moves away from the axially supported disc until another ball rests against the second end stops 72.

FIG. 2b shows the track shape in a longitudinal section wherein the ball stops 71 and 72 are provided at the deepest point A and, respectively, at the flattest point B of the ball groove 39 and have the shape of a spherical shell.

FIG. 3a shows the disc 24 in an axial view, provided with balls, with the tooth segment 22 being visible as a detail. There are provided three equally long, uniformly circumferentially distributed ball grooves 34 which extend from a first axial end stop 71 of the greatest depth at the end A to a second end stop 72 of the smallest depth at the end B. The ball grooves in a matching disc 29, in a plan view, form an identical image, so that if the components are assembled as specified, the pairs of grooves can be made to overlap by means of their first ends A. The ball grooves each contain two balls 35 which are held at the illustrated circumferential distance from one another by a cage (not illustrated). One ball 35 is positioned close to the second end stop B, in which case the discs are positioned furthest away from one another.

A rotation of the discs relative to one another causes the balls 35 in both grooves of a pair of grooves to move to the end stops A, as a result of which the axially movable one of the discs approaches the axially supported disc until the respective other one of the balls stops against the first end stops A.

FIG. 3b shows the track shape in a cross-sectional view. The ball groove 34, above a base 43 with a smaller diameter than that of the ball 35, comprises two flanks 44 and 45 which open in a V-like way and which form two contact points 46 and 47 with the ball.

I claim:

1. An axial adjusting device comprising two discs rotatable relative to one another and supported coaxially to one another, guided balls between said discs in pairs of ball grooves whose depth varies across the circumference of the discs, each pair of ball grooves guiding at least two balls, one of said discs being axially supported and the other of said discs being axially displaceable against resilient returning forces of spring means, at least one of said discs being rotatingly drivable by a driving motor, wherein said ball grooves comprise a cross-section which deviates from the circular arch shape, wherein the balls each are in a two-point contact with the individual ball grooves.

2. A device according to claim 1 having three pairs of ball grooves.

3. A device according to claims 1 or 2 having a cage for the balls, which cage hold the at least two balls in each pair of ball grooves at a circumferential distance from one another between the discs.

4. An axial adjusting device comprising two discs rotatable relative to one another and supported coaxially to one another, guided balls between said discs in pairs of ball grooves whose depth varies across the circumference of the discs, each pair of ball grooves guiding two balls, one of said discs being axially supported and the other of said discs being axially displaceable against resilient returning forces of spring means, at least one of said discs being rotatingly drivable by a driving motor, wherein said ball grooves comprise a cross-section which deviates from the circular arch shape, wherein the balls each are in a two-point contact with the individual ball grooves.

* * * * *